United States Patent
Lake et al.

(10) Patent No.: US 8,513,329 B2
(45) Date of Patent: Aug. 20, 2013

(54) CHEMICAL ADDITIVES TO MAKE POLYMERIC MATERIALS BIODEGRADABLE

(75) Inventors: John Allen Lake, Cedar Crest, NM (US); Samuel David Adams, Albuquerque, NM (US)

(73) Assignee: Bio-Tec Environmental, LLC, Albuquerque, NM (US)

( * ) Notice: Subject to any disclaimer, the term of this patent is extended or adjusted under 35 U.S.C. 154(b) by 158 days.

(21) Appl. No.: 12/113,844

(22) Filed: May 1, 2008

(65) Prior Publication Data

US 2013/0109781 A1   May 2, 2013

Related U.S. Application Data

(63) Continuation-in-part of application No. 11/932,654, filed on Oct. 31, 2007.

(60) Provisional application No. 60/855,430, filed on Oct. 31, 2006.

(51) Int. Cl.
```
C08K 5/092     (2006.01)
C08K 5/101     (2006.01)
C08K 5/1535    (2006.01)
B32B 27/00     (2006.01)
B32B 27/06     (2006.01)
B32B 27/08     (2006.01)
B32B 27/30     (2006.01)
B32B 27/32     (2006.01)
B32B 27/34     (2006.01)
B32B 27/36     (2006.01)
```

(52) U.S. Cl.
USPC ........... 523/124; 524/111; 524/304; 524/315; 428/412; 428/474.4; 428/480; 428/500

(58) Field of Classification Search
USPC ......... 523/124; 524/111, 304, 315; 428/412, 428/474.4, 480, 500
See application file for complete search history.

(56) References Cited

U.S. PATENT DOCUMENTS

| | | |
|---|---|---|
| 5,321,088 A | 6/1994 | Schwab |
| 5,474,995 A | 12/1995 | Ducharme et al. |
| 5,518,730 A | 5/1996 | Fuisz |
| 5,599,960 A | 2/1997 | Boden et al. |
| 5,639,466 A | 6/1997 | Ford et al. |
| 5,663,216 A | 9/1997 | Tomka |
| 5,726,161 A | 3/1998 | Whistler |
| 5,736,595 A | 4/1998 | Gunther et al. |
| 5,859,090 A | 1/1999 | Shahid et al. |
| 5,929,133 A | 7/1999 | Watanabe et al. |
| 5,934,495 A | 8/1999 | Chiodo |
| 6,060,046 A | 5/2000 | Steinberg et al. |
| 6,225,388 B1 | 5/2001 | Tsai et al. |
| 6,239,173 B1 | 5/2001 | Wang et al. |
| 6,296,889 B1 | 10/2001 | Ott et al. |
| 6,635,692 B1 | 10/2003 | Christie et al. |
| 7,037,983 B2 | 5/2006 | Huang et al. |
| 7,053,130 B2 | 5/2006 | Nagarajan |
| 7,067,596 B2 | 6/2006 | Bastioli et al. |
| 7,265,160 B2 * | 9/2007 | Oka et al. ...................... 521/50.5 |
| 7,368,503 B2 | 5/2008 | Hale |
| 7,369,503 B2 * | 5/2008 | Takahashi et al. ............ 370/236 |
| 7,560,266 B2 | 7/2009 | Bramucci et al. |
| 7,812,066 B2 | 10/2010 | Takenaka et al. |
| 7,816,424 B2 | 10/2010 | Takahashi et al. |
| 8,222,316 B2 | 7/2012 | Lake et al. |
| 2003/0157214 A1 | 8/2003 | Bonsignore et al. |
| 2004/0068059 A1 | 4/2004 | Katayama et al. |
| 2004/0076778 A1 | 4/2004 | Mori et al. |
| 2004/0143043 A1 | 7/2004 | Gencer et al. |
| 2005/0154114 A1 | 7/2005 | Hale |
| 2005/0181157 A1 | 8/2005 | Otome |
| 2005/0181158 A1 | 8/2005 | Otome et al. |
| 2005/0208095 A1 | 9/2005 | Hunter et al. |
| 2007/0010632 A1 | 1/2007 | Kaplan et al. |

FOREIGN PATENT DOCUMENTS

| | | |
|---|---|---|
| CA | 2030852 | 4/1995 |
| EP | 1321289 A1 | 6/2003 |
| JP | 5057833 | 3/1993 |
| JP | 1995-290645 | 11/1995 |
| JP | 2000-103025 | 4/2000 |
| JP | 2000-136466 | 5/2000 |
| JP | 2001-181270 | 7/2001 |
| JP | 2002-356623 | 12/2002 |
| JP | 2004-143193 | 5/2004 |
| WO | WO 03/046060 A1 | 6/2003 |

OTHER PUBLICATIONS

Abou-Zeid, Dunja-Manal et al., "Degradation of Natural and Synthetic Polyesters Under Anaerobic Conditions", Journal of Biotechnology vol. 86, 2001, 113-126.

Albertsson, A. et al., "Degradable Polymers for the Future", Acta Polymer vol. 46 No. 2, 1995, 114-123.

Armani, Denize et al., "Microfabrication Technology for Polycaprolactone, a Biodegradable Polyer", J. Micromech. Microeng. vol. 10, 2000, 80-84.

Barlaz, M. A. et al., "Biodegradative Analysis of Municipal Solid Waste in Laboratory-Scale Landfills", United States Environmental Protection Agency, 1997, 1-5.

Bonhomme, S. et al., "Environmental Biodegradation of Polyethylene", Polymer Degradation and Stability vol. 81, 2003, 441-452.

Cacciari, I. et al., "Isotactic Polypropylene Biodegradation by a Microbial Community: Physicochemical Characterization of Metabolites Produced", Applied and Environmental Microbiology vol. 59 No. 11, 1993, 3695-3700.

(Continued)

*Primary Examiner* — Kriellion Sanders

(74) *Attorney, Agent, or Firm* — Peacock Myers, P.C.; Janeen Vilven

(57) ABSTRACT

The present invention is a new additive material that is physically blended with polymeric material to create at least a partially biodegradable product.

20 Claims, 2 Drawing Sheets

(56) References Cited

OTHER PUBLICATIONS

Corti, Andrea et al., "Biodegradable Hybrid Polymeric Materials Based on Lignin and Synthetic Polymers", Biodegradable Polymers and Plastics, 2003, 141-153.

Darby, Richard T. et al., "Fungal Susceptibility of Polyurethanes", Applied Microbiology vol. 16 No. 6, 1968, 900-905.

Gilan, I. et al., "Colonization, Biofilm Formation and Biodegradation of Polyethylene by a Strain of *Rhodococcus ruber*", Appl Microbiol Biotechnol vol. 65, 2004, 97-104.

Hadad, D. et al., "Biodegradation of Polyethylene by the Thermophilic Bacterium *Brevibacillus borstelensis*", Journal of Applied Microbiology vol. 98, 2005, 1093-1100.

Haines, J. R. et al., "Microbial Degradation of High-Molecular-Weight Alkanes", Applied Microbiology vol. 28 No. 6, 1974, 1084-1085.

Iwamoto, Akira, "Effect of the Phase Structure on Biodegradability of Polypropylene/Poly(ε-Caprolactone) Blends", Journal of Applied Polymer Science vol. 52 No. 9, 1994, 1357-1360.

Iwamoto, Akira et al., "Enzymatic Degradation of Plastics Containing Polycaprolactone", Polymer Degradation and Stability vol. 45, 1994, 205-213.

Kim, D.Y. et al. "Biodegradation of Microbial and Synthetic Polyesters by Fungi", Appl. Microbiol Bitechnol vol. 61 No. 4, 2003, 300-308.

Kumagai, Yoshiharu et al., "Enzymatic Degradation and Morphologies of Binary Blends of Microbial Poly(3-Hydroxy Butyrate) with Poly(ε-Caprolactone), Poly(1,4-Butylene Adipate and Poly(Vinyl Acetate)", Polymer Degradation and Stablility vol. 36, 1992, 241-248.

Mochizuki, Masatsugu et al., "Studies on Biodegradable Poly(Hexano-6-Lactone) Fibers. Part 2: Environmental Degradation", Pure Appl. Chem. vol. 71 No. 11, 1999, 2177-2188.

Rutkowska, Maria et al., "The Influence of Different Processing Additives on Biodegradation of Poly(ε-Caprolactone)*", Iranian Polymer Journal Vo.l 9 No. 4, 2000, 221-227.

* cited by examiner

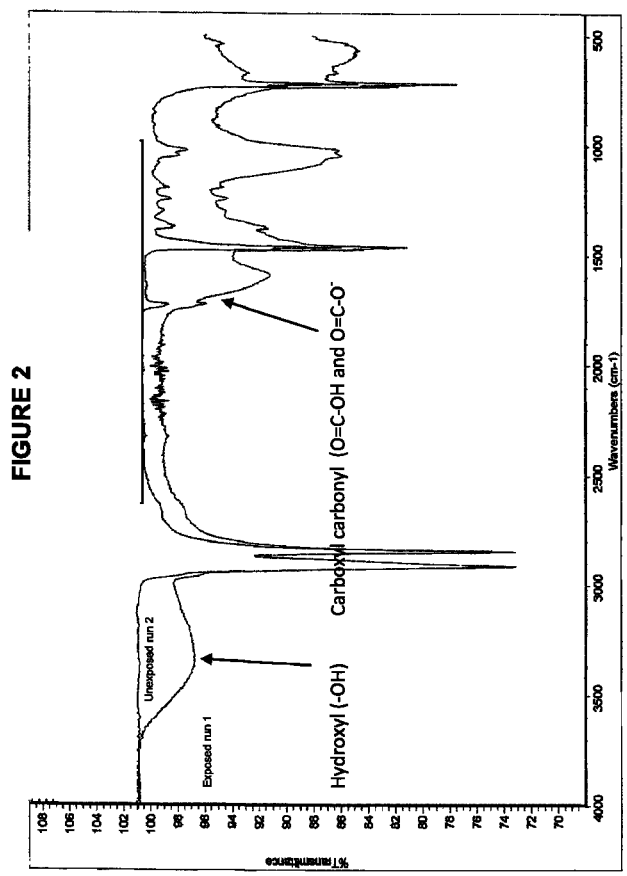

CHEMICAL ADDITIVES TO MAKE POLYMERIC MATERIALS BIODEGRADABLE

CROSS-REFERENCE TO RELATED APPLICATIONS

This application is a continuation-in-part application of U.S. patent application Ser. No. 11/932,654, entitled "Chemical Additives to Make Polymeric Material Biodegradable", to John A. Lake, et al., filed on Oct. 31, 2007, which claims the benefit of filing of U.S. Provisional Patent Application Ser. No. 60/855,430, entitled "Chemical Additives to Make Polymeric Materials Biodegradable", to John A. Lake, et al., filed on Oct. 31, 2006, and the specifications and claims thereof are incorporated herein by reference.

BACKGROUND OF THE INVENTION

Field of the Invention (Technical Field)

The present invention relates to new additive materials that are physically blended with polymeric materials to impart biodegradability to resulting articles formed from the polymeric materials.

Plastics are industrially mass-produced and at the same time are used widely in daily life and in industrial fields with their usage increasing greatly. It is desirable to produce plastics that withstand the forces of nature. Many plastics are not degraded in natural environments, and so in recent years, environmental littering and destruction due to discarded plastics has occurred. Accordingly, in recent years, development of plastics that can be biodegraded in natural environments has been desired.

U.S. Pat. No. 7,037,983 issued to Huang, et al, on May 2, 2006 teaches methods of making functional biodegradable polymers and methods to modify biodegradable polymers using a direct chemical reaction of a biodegradable polymer in a vinyl monomer. Huang chemically combines the additive material into the chemical chains of the polymers.

U.S. Patent Application Publication 2004/0076778 teaches a biodegradable bag is taught which comprises a laminated film obtainable by laminating a sealant layer comprising a biodegradable polymer, a barrier layer having an oxygen barrier property and a water vapor barrier property and a barrier layer-supporting substrate layer comprising a biodegradable polymer, said laminated film being heat-sealed in order for the sealant layer to be inside. There is no teaching of seeded microbes for degrading the polymer in the layers.

U.S. Patent Application. Publication 2004/0068059 teaches performing a condensation polymerization reaction of a mixture made of the three components: an aliphatic diol, an aliphatic dicarboxylic acid, and an aliphatic hydroxycarboxylic acid or its anhydrous cyclic compound (a lactone) to synthesize a low molecular weight polyester copolymer having a weight average molecular weight of 5,000 or more, preferably 10,000 or more, and adding a bifunctional coupler to the polyester copolymer in a molten state. Further, a high molecular weight aliphatic polyester copolymer and a high molecular weight aliphatic polyester copolymer containing polylactic acid having moldable properties is disclosed. These copolymers can be degraded by microorganisms present in soils or water.

U.S. Patent Application Publication 2003/0157214 teaches a composition of graft copolymers of polyhydroxy compounds. The composition provides an effective method to create environmentally friendly chewing gum.

Furanone-derived compositions have been known in the art to have various utilities. For example, U.S. Pat. No. 6,296,889 describes the use of certain furanone compounds in conjunction with 1-nonen-3-one to provide dairy and coffee aroma flavor enhancement. Specific furanones (for example, 3,-(3,4-difluorophenyl)-4-(4-(methylsulfonyl)phenyl)-2-(5H)-furanone, 3-phenyl-4-(4-(methylsulfonyl)phenyl)-2-(5H)-furanone and 5,5-dimethyl-4-(4-(methylsulfonyl)phenyl)-3-(3-fluorophenyl)-5H-furan-2-one) have been shown to be cyclooxygenase-2 (COX-2) inhibitors useful in treating certain inflammatory conditions (U.S. Pat. No. 5,474,995, U.S. Pat. No. 6,239,173). The diversity of furanone derivative utilities is further illustrated by the discovery of certain halogenated furanones isolated from the Australian red seaweed *Delisea nulcha* as marine anti-fouling agents (U.S. Pat. No. 6,060,046) capable of preventing growth of various seaweeds, invertebrates and bacteria on marine structures.

U.S. Pat. No. 5,599,960 issued to Boden et al., on Feb. 4, 1997 teaches a 3,5-dimethyl-pentenyl-dihydro-2(3H)-furanone isomer mixture with organoleptic properties. The mixture has a sweet, lactonic, coumarinic, jasmine aroma with intense green, citrusy, sweet, lactonic topnotes and bergamot peel and lemony undertones and is a pleasant odor to humans. This aroma is highly desirable in several types of perfume compositions, perfumed articles, colognes, deodorizing compositions and odor maskant compositions.

BRIEF SUMMARY OF THE INVENTION

One embodiment of the present invention provides a biodegradable additive for polymeric material comprising a chemo attractant compound; a glutaric acid or its derivative; a carboxylic acid compound; a polymer; and a swelling agent. In addition, the additive may further comprise one or more of the following: a microbe which can digest the polymeric material a compatibilizing additive, a positive chemotaxis agent to attract the microbes, metal to induce rusting, colorants, and/or inks, and/or metallic particles to increase or decrease light reflectance, add strength, slow or prevent the breakdown of a layer or vary the time to break down, or a carrier resin.

In a preferred embodiment, the polymer is selected from the group consisting of: polydivinyl benzene, ethylene vinyl acetate copolymers, polyethylene, polypropylene, polystyrene, terethalate, polyesters, aliphatic polyesters, aliphatic aromatic polyesters, polyvinyl chloride, polymethyl methacrylate, polycarbonate, polyamide, and any copolymers of said polymers.

In a preferred embodiment the carrier resin is selected from the group consisting of: polydivinyl benzene, ethylene vinyl acetate copolymers, maleic anhydride copolymers, acrylic acid copolymers with polyolefins.

In a more preferred embodiment, the microbe and the chemo attractant compound are disposed within a capsule in order to facilitate controlled release of the material.

The furanone may be for example 2(3H)-Furanone compound with methane but is not limited thereto.

The carboxylic acid compound preferably comprises a chain length from about 2 to about 36 carbons.

In another preferred embodiment, the additive further comprises a graft copolymer. The graft copolymer comprises either a caprolactone, a polycaprolactone or a lactide and an ethylene resin.

According to another embodiment a method for creating a layered polymer plastic is disclosed comprising: providing at least one layer of a polymer; and layering products around the polymer to create a new biodegradable product. In a preferred embodiment, one layer comprises an enzyme or enzymes suitable for degrading the polymer. In a preferred embodiment, enzyme or enzymes are applied to at least one layer using vapor deposition. In a more preferred embodiment the layering is biaxially oriented. In another preferred embodiment, the layering is shaped like honey comb hexagon shapes. In an alternate embodiment, an inner layer is rigid against mechanical stress. In yet another alternative embodiment, at least one layer comprises a fragrance. In a further embodiment, at least one layer comprises a graft polymer. In a preferred embodiment, at least one layer is one or more of the following: a smell attractant for microbes, an initiator that modifies the polymer, or has perforations.

According to another embodiment of the present invention, a biodegradable additive for polymeric material preferably comprises a N-acyl homoserine lactone, a glutaric acid or its derivative, a carboxylic acid compound, a polymer and a swelling agent.

In response to the need for a better and more effective way to render polymeric materials biodegradable, the present invention teaches how to make additive materials and how to effectively use those materials to render polymeric materials biodegradable Therefore it is an object of the present invention to make a wide variety of polymeric materials biodegradable no matter what their chemical composition.

It is a further object of the present invention to make biologically safe and biodegradable polymeric materials without having to chemically modify the polymeric molecules.

It is another object of the present invention to have an additive material that can make most polymeric compositions biodegradable by merely mixing it in with the polymeric material any time before the polymeric material is formed into an article for sale.

One aspect of the present invention provides controlled release technology for the controlled release of perfumes into gaseous environments during polymer degradation.

These and other objects of the present invention will become clear to those of ordinary skill in this art by reviewing this description and claims appended hereto.

BRIEF DESCRIPTION OF THE DRAWINGS

FIG. 2 illustrates the comparative FTIR spectra of 2% additive-treated polyethylene sample before and after biodegradation testing.

DETAILED DESCRIPTION OF THE INVENTION

Figure 1:
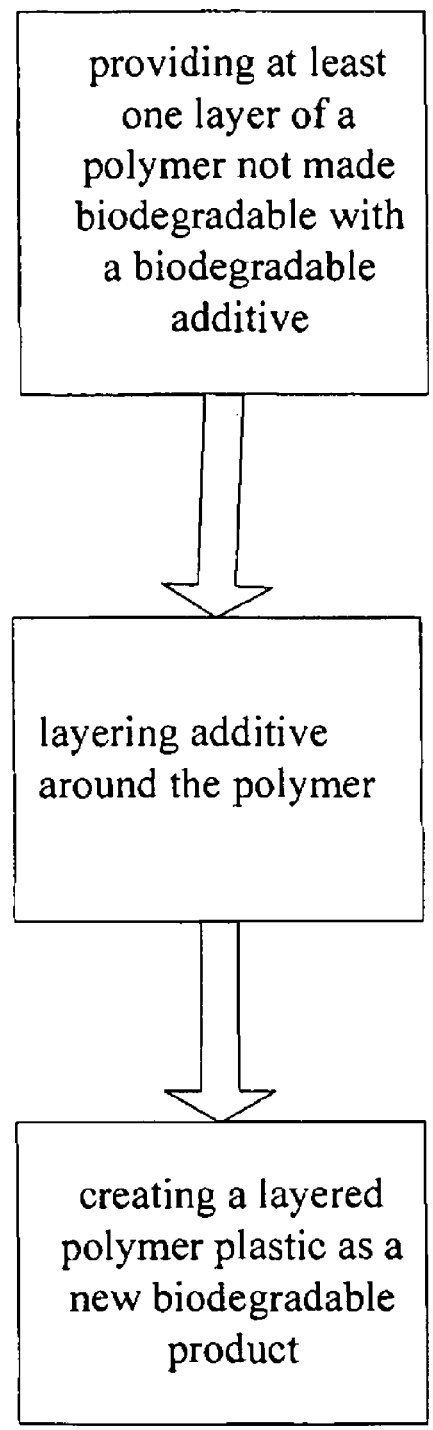
FIG. 1 illustrates one embodiment of making a polymer biodegradable with layering of additive.

As used herein, "a" means one or more.

As used herein, "chemo attractant" is an inorganic or organic substance possessing inducer effect in motile cells.

As used herein "polymer" is a synthetic and/or natural macromolecules composed of smaller units called monomers that are bonded together.

Polymers

Polymers are synthetic and natural macromolecules composed of smaller units called monomers that are bonded together. Thermoplastics are a type of polymer that can melt or deform, melts to a viscous liquid when heated and freezes to a brittle, glassy state when cooled below its brittleness temperature. Most thermoplastics are high molecular weight polymers whose chains associate through weak van der Waals forces (such as polyethylene or stronger dipole-dipole interactions and hydrogen bonding (such as polyamide). Thermoplastic polymers differ from thermosetting polymers as they can, unlike thermosetting polymers, be remelted and remolded. Many thermoplastic materials are addition polymers; e.g., vinyl chain-growth polymers such as polyethylene and polypropylene.

The major types of thermoplastics include linear low density polyethylene, high density polyethylene, polyvinyl chloride, low density polyethylene, polypropylene, polystyrene, polyethylene terephthalate and other resins. The major classes of thermosetting polymer resins include unsaturated polyesters.

Certain polymers are taught by the literature as not biodegradable or only very slowly biodegradable. One embodiment of the present invention enables the acceleration of biodegradation of a wide range of polymers to such an extent as to significantly reduce their environmental impact without adversely affecting their desirable physical properties.

These polymers include polystyrene, polyurethane, polyethylene, polypropylene, or polycarbonate plastics. Petroleum-based polymers made from groups such as aldehydes, acids, diols, diamines, diacids, ethylene, propylene, styrene and other precursors are also taught as not biodegradable. One embodiment of the present invention is directed to increasing the biodegradability of non-biodegradable polymers by addition of a biodegradable polymer additive to the polymer composition.

Biodegradable Polymers

Biodegradation is generally considered as comprising enzyme-catalyzed hydrolysis, oxidation, and/or reduction. The enzymes may be either endoenzymes which function within the microorganisms or exoenzymes which function outside the microorganisms.

Biodegradation is a functional decay of material, e.g. loss of strength, substance, transparency, or good dielectric properties where it is known to be identifiable with exposure of the material to a living environment, which may itself be very complex, and the property loss may be attributable to physical or chemical actions as first steps in an elaborate chain of processes.

A biodegradable polymer is a high molecular weight polymer that, owing to the action of micro- and/or macroorganisms or enzymes, degrades to lower molecular weight compounds. The process is called catabolism. Natural polymers are by definition those which are biosynthesized by various routes in the biosphere. Proteins, polysaccharides, nucleic acids, lipids, natural rubber, and lignin, among others, are all biodegradable polymers. The rate of their biodegradation may vary from hours to years depending on the nature of the functional group and degree of complexity. Biopolymers are organized in different ways at different scales. This hierarchical architecture of natural polymers allows the use of relatively few starting molecules (i.e. monomers), which are varied in sequences and conformations at molecular-, nano-, micro-, and macroscale, forming truly environmentally adaptable polymers.

On the other hand, the repetitive units of synthetic polymers are hyrolyzable, oxidizable, thermally degradable, or degradable by other means. Nature also uses these degradation modes, e.g., oxidation or hydrolysis, so in that sense there is no distinction between natural or synthetic polymers. The catalysts promoting the degradations in nature (catabolisms) are the enzymes, which are grouped in six different classes according to the reaction catalyzed. These classes include oxidoreductase for catalyzing redox reactions, transferase for catalyzing transfer of functional group reactions, hydrolase for catalyzing hydrolysis, lyase for catalyzing addition to double bond reactions, isomerase for catalyzing isomerization and ligase for catalyzing formation of new bonds using ATP.

Biodegradation of oxidizable polymers is generally slower than biodegradation of hydrolyzable ones. Even polyethylene, which is rather inert to direct biodegradation, has been shown to biodegrade after initial photo-oxidation. An oxidized polymer is more brittle and hydrophilic than the corresponding nonoxidized polymer, which also usually results in a material with increased biodegradability. Means to accelerate the oxidation of polymers (for example polyolefins) are presented according to one embodiment of the present invention.

For example, by combining a nickel dithiocarbamate (photo antioxidant) with an iron dithicarbamate (photo pro-oxidant), a wide range of embrittlement times may be obtained.

One embodiment of the present invention provides for increased susceptibility to biodegradation of polymers by means of additives including a biopolymer. In this way a polymer blend is obtained that is more susceptible to biodegradation.

Combining granular starch mixed with polyethylene together with an unsaturated polymer, a thermal stabilizer, and a transition metal produce a material with increased susceptibility to photo-oxidation, thermolysis, and biodegradation. This particular material has also an induction time before degradation may be initiated. The use of starch alone in polyethylene, for example, requires, however, rather large amounts in order to really create an increase in the biodegradation rate.

According to one embodiment, a filler is added to a composition to be added to a polymer there by increasing the biodegradability.

Microbial or enzymatic attack of pure aromatic polyester is increased by exposure to certain microorganisms, for example *Trichosporum, athrobacteria* and *Aspergillus niger*.

Aliphatic polyester degradation is seen as a two-step process: the first is hydrolysis of the ester linkages. The second is enzymatic conversion of the intermediates to residues that can be assimilated by microbial cells.

Polyurethane degradation may occur by fungal degradation, bacterial degradation and degradation by polyurethane enzymes.

Microbes

A variety of microorganisms, including bacteria and fungi, aid in degrading polymeric materials. Preliminary Review of the Degradation of Cellulosic, Plastic, and Rubber Materials in the Waste Isolation Pilot Plant, and Possible Effects of Magnesium Oxide Safety Factor Calculations, Prepared for U.S. EPA Office of Radiation and Indoor Air (Sep. 11, 2006). Actinobacteria are a type of bacteria that are most(ly) commonly found in soil and can thrive in low-nutrient environments. They can survive in both aerobic and anaerobic conditions, although most are aerobic. The most important role of the Actinobacteria is decomposition of organic nutrients, such as cellulose, and they are one of the few bacteria able to consume lignocellulose.

Fungi (molds) commonly require oxygen and a pH range of 4.5 to 5 to proliferate. Fungi grow at temperatures ranging up to 45° C., although optimum growth rates generally occur at temperatures between 30° C. and 37° C. Because most fungi require oxygen, they may only be available for cellulosic, plastic and rubber (CPR) degradation before closure and for a relatively short time (compost environment). There is some evidence that anaerobic fungi may degrade lignocellulosic materials.

Biodegradation processes can affect polymers in a number of ways. Microbial processes that can affect polymers may include mechanical damage caused by growing cells, direct enzymatic effects leading to breakdown of the polymer structure, and secondary biochemical effects caused by excretion of substances other than enzymes that may directly affect the polymer or change environmental conditions, such as pH or redox conditions. Although microorganisms such as bacteria generally are very specific with respect to the substrate utilized for growth, many are capable of adapting to other substrates over time. Microorganisms produce enzymes that catalyze reactions by combining with a specific substrate or combination of substrates. The conformation of these enzymes determines their catalytic reactivity towards polymers. Conformational changes in these enzymes may be induced by the changes in pH, temperature, and other chemical additives.

Microbes and Plastics Degradation

For the enzymatic degradation of synthetic plastic polymers, polymers containing hydrolysable groups in the polymer backbone would be especially prone to microbial attack, because many microorganisms are capable of producing hydrolases (enzymes catalyzing hydrolysis). In general, aliphatic polyesters, polyurethane, polyethers, and polyimides are more easily degraded by commonly occurring microorganisms. Generally, higher molecular weight polymers and branched polymers are more resistant to microbial degradation. Polyethylene and polyvinylchloride are considered to be relatively resistant to microbial degradation. However, some bacterial strains have been identified that can degrade polyethylene, including *Rhodococcus* and *B. borstelensis*.

The ability of microorganisms to adapt to a new source of nutrients is highly noteworthy in any evaluation of the microbial degradation of plastic materials. Evidence of adaptation of bacteria for the degradation of plastics has been shown in several cases. For example, it was found that *Pseudomonas aeruginosa* started proliferation 56 days after the bacteria were brought into contact with polyamide-6 polymer. Inoculation of previously untreated polyamide with these bacteria resulted in immediate growth on the new substrate. Individual species of bacteria can carry out several different steps of chemical breakdown or biodegradation. Most toxic compounds are degraded or biodegraded by groups called consortia. Each species in the group works on a particular stage of the degradation process, and one or more of them together are needed for the complete degradation or biodegradation or detoxification process. Contaminated vessels containing such things as pesticides, metals, radioactive elements, mixed wastes and the like can be made to contain microbes that will detoxify and decompose the contaminates and biodegrade the vessel.

The rate and manner of decomposition that a microbe can produce is strongly affected by a number of factors. In roughly descending degrees of importance, they are: temperature, availability of oxygen or lack or it, burial and depth of burial of the product the microbe is decomposing, humidity or wetness, rainfall, size and weight of product and environment in which the product rests.

Other microbes that may assist in biodegradation are psychrophiles, mesophiles, thermophiles, actinomycetes, saprophytes, *absidia, acremonium, alternaria,* amerospore, *arthrinium,* ascospore, *aspergillus, aspergillus caesiellus, aspergillus candidus, aspergillus carneus, aspergillus clavatus, aspergillus deflectus, aspergillus flavus, aspergillus fumigatus, aspergillus glaucus, aspergillus nidulans, aspergillus ochraceus, aspergillus oryzae, aspergillus parasiticus, aspergillus penicilloides, aspergillus restrictus, aspergillus*

*sydowi, aspergillus terreus, aspergillus ustus, aspergillus versicolor, aspergillus/penicillium*—like, *aureobasidium,* basidiomycetes, basidiospore, *bipolaris, blastomyces, B. borstelensis, botrytis, candida, cephalosporium, chaetomium, cladosporium, cladosporium fulvum, cladosporium herbarum, cladosporium macrocarpum, cladosporium sphaerospermum, conidia, conidium, conidobolus, Cryptococcus neoformans, cryptostroma corticale, cunninghamella, curvularia, dreschlera, epicoccum, epidermophyton,* fungus, *fusarium, fusarium solani, geotrichum, gliocladium, helicomyces, helminthosporium, histoplasma, humicula,* hyaline mycelia, *memnoniella, microsporum,* mold, *monilia, mucor, mycelium, myxomycetes, nigrospora, oidium, paecilomyces, papulospora, penicillium, periconia, perithecium, peronospora, phaeohyphomycosis, phoma, pithomyces, rhizomucor, rhizopus, rhodococcus, rhodotorula,* rusts, *saccharomyces, scopulariopsis, sepedonium, serpula lacrymans,* smuts, *spegazzinia,* spore, *sporoschisma, sporothrix, sporotrichum, stachybotrys, stemphylium, syncephalastrum, Thermononespore fusca* DSM43793, *torula, trichocladium, trichoderma, trichophyton, trichothecium, tritirachium, ulocladium, verticillium, wallemia* and yeast.

One or more furanone compounds may be combined to act as chemoattractants for bacteria and or as odorants for the decomposing polymer. Some furanones, particularly certain halogenated furanones are quorum sensing inhibitors. Quorum sensing inhibitors are typically low-molecular-mass molecules that cause significant reduction in quorum sensing microbes. In other words, halogenated furanones kill certain microbes. Halogenated furanones prevent bacterial colonization in bacteria such as *V. fischeri, Vibrio harveyi, Serratia ficaria* and other bacteria. However, the natural furanones are ineffective against *P. aeruginosa*, but synthetic furanones can be effective against *P. aeruginosa*.

Some furanones, including those listed below, are actually chemo attractant agents for bacteria. Suitable furanones may include but are not limited to: 3,5-dimethylpentenyl-dihydro-2(3H)furanone isomer mixtures, emoxyfurane and other N-acylhomoserine lactones.

Bacteria that have shown to attract to the furanone compounds listed above include, but are not limited to *C. violaceum,*

Other chemo attractant agents include sugars that are not metabolized by the bacteria. Examples of these chemo attractant agents may include but are not limited to: galactose, galactonate, succinate, malate, aspartate, serine, fumarate, ribose, pyruvate, oxalacetate and other L-sugar structures and D-sugar structures but not limited thereto. Examples of bacteria attracted to these sugars include, but are not limited to *Escherichia coli,* and *Salmonella*. In a preferred embodiment the sugar is a non-estererfied starch One embodiment of the present invention is used with any carrier resin such as Ethylene-Vinyl Acetate Copolymer comprising additive ingredients of organoleptic organic substances such as cultured colloids and natural or manmade fibers or resins. When combined in small quantities with any of the plastic fibers or resins, the present invention renders the end products biodegradable while maintaining their desired characteristics.

An important attribute of the invention is its use without having to significantly modify the existing methods of production of plastic products. The resulting polymers and plastic products made therefrom exhibit the same desired mechanical properties, and have effectively similar shelf-lives as products without the additive, and yet, when disposed of, are able to at least partially metabolize into inert biomass by the communities of anaerobic and aerobic microorganisms commonly found almost everywhere on Earth.

This biodegradation process can take place aerobically or anerobically. It can take place with or without the presence of light. Traditional polymers are now able to biodegrade in landfill and compost environments within a reasonable amount of time as defined by the EPA to be 30 to 50 years on average.

One embodiment of the present invention differs significantly from other "degradable plastics" emerging in the market today because it does not attempt to replace the currently popular plastic resin formulations but instead enhances them by rendering them biodegradable. One embodiment of the present invention is superior to those currently in the market place for several reasons. Photo-degradable products, for example, do not degrade in landfills due to the lack of sunlight (they are typically covered with another layer of trash before the degradation can occur). At the same time these photo-degradable products present difficult circumstances for storage before use due to their reactivity to light. Similarly, plastic products manufactured with high amounts of cornstarch and cottonseed fillers fail to breakdown the molecular structure of the products' plastic components, partially break down only in commercial compost facilities, are very expensive to manufacture, and often do not achieve the requisite physical properties.

One embodiment of the present invention allows for a process which first attracts microorganisms through chemo taxis and then enables the microorganisms in the environment to metabolize the molecular structure of plastic films. The films may be degraded into an inert humus-like form that is harmless to the environment. An example of attracting microorganisms through chemo taxis is to use a positive chemo taxis, such as a scented polyethylene terephthalate pellet, starch D-sugars not metabolized by the microbes or furanone that attracts microbes or any combination thereof.

In a preferred embodiment, several proprietary bio-active compounds are combined into a master batch pellet that is easily added to plastic resins and colorants. The biodegradation process begins with one or more proprietary swelling agents that, when combined with heat and moisture, expands the plastics' molecular structure.

After the one or more swelling agents create space within the plastic's molecular structure, the combination of bio-active compounds discovered after significant laboratory trials attracts a colony of microorganisms that break down the chemical bonds and metabolize the plastic through natural microbial processes.

One embodiment of the present invention provides an improved formulation of an additive material that can be added to various polymeric materials and colorants, and mixed into such materials to make them biodegradable without having to chemically alter the polymeric molecules. This is important to preserving the formability of the polymeric materials so that they can be used for their essential purpose of being formed into articles that then can be sold into the streams of commerce for use by the customer. Once the product is used it can be discarded and sent to a land fill where once the products are buried into an environment lacking in oxygen the articles will biodegrade within a reasonably short time thus eliminating a serious environmental problem with the disposal of plastics in particular.

According to one embodiment of the present invention, an additive preferably comprises a chemoattractant compound, a glutaric acid or its derivative, a carboxylic acid compound, and a polymer. In this embodiment, the carboxylic acid compound preferably comprises a carbon backbone anywhere from about 2 to 10, 10 to 100 and 100 to 1,000 carbons and preferably 2 to 36 and more preferably a backbone length from about 5 to about 18 carbons. The carbon backbone can have single bonds, double bonds or triple bonds. In an alternative embodiment, the carbon backbone preferably ends, on either end, in an aromatic, carboxylic, ester, amide, alkyl group, alkane, alkene, alkyne or any combination thereof on either end of the carbon backbone. The additive may also comprise organoleptic organic chemicals as natural fibers, cultured colloids, cyclo-dextrin, polylactic acid, etc.

According to one embodiment of the present invention, an additive comprises a furanone compound, a glutaric acid, a hexadecanoic acid compound, a polycaprolactone polymer, a carrier resin to assist with placing the additive material into the polymeric material in an even fashion to assure proper biodegradation. The additive may also comprise organoleptic organic chemicals such as natural fibers, cultured colloids, cyclo-dextrin, polylactic acid, etc.

The additive material renders a wide variety of polymeric materials biodegradable which would not ordinarily be biodegradable. Examples of such polymeric materials include straight chain and branched chain addition polymers, copolymers, as well as condensation polymers. It includes aliphatic as well as aromatic based polymer materials. More specifically the additive is effective in rendering polyethylenes, polypropylenes, polyvinyl acetates, polyvinyl chlorides, polystyrenes, polyesters and polyamides biodegradable so that they may be simply added to a landfill in the presence or absence of oxygen to initiate biodegradation, as well as in enhancing the inherent biodegradability of polymers such as lactic acid polymers and copolymers with glycolic acid, $\in$-caprolactone, and the like.

According to one embodiment of the present invention, an additive comprises a mixture of a furanone compound, a glutaric acid, a hexadecanoic acid compound, a polycaprolactone polymer, organoleptic swelling agent (natural fiber, cultured colloid, cyclo-dextri, Polylactic acid, etc.) and a carrier resin to assist with placing the additive material into the polymeric material to be rendered biodegradable in an even fashion to assure proper biodegradation. Preferably, the furanone compound is in a range equal to or greater than 0-20% by weight. In a more preferred embodiment, the furanone compound is 20-40% by weight, more preferably 40-60% by weight, still more preferably 60-80% by weight or preferably 80-100% by weight of the total additive. The glutaric acid is in the range equal to or greater than 0-20% by weight of the total additive. In a more preferred embodiment, the glutaric acid is 20-40% by weight, more preferably 40-60% by weight, still more preferably 60-80% by weight or preferably 80-100% by weight, 20-40%, 40-60%, 60-80% or 80-100% by weight of the total additive. The hexadecanoic acid compound is in the range equal to or greater than 0-20% by weight of the total additive. In a more preferred embodiment, the hexadecanoic acid is 20-40% by weight, more preferably 40-60% by weight, still more preferably 60-80% by weight or preferably 80-100% by weight, 20-40%, 40-60%, 60-80% or 80-100% by weight of the total additive. The polycaprolactone polymer is in the range equal to or greater than 0-20% by weight of the total additive. In a more preferred embodiment, the polycaprolactone is 20-40% by weight, more preferably 40-60% by weight, still more preferably 60-80% by weight or preferably 80-100% by weight, 20-40%, 40-60%, 60-80% or 80-100% by weight of the total additive. The natural or manmade organoleptic swelling agent (e.g. natural fiber, cultured colloid, cyclo-dextrin, or polylactic acid) is in the range equal to or greater than 0-20% by weight of or greater than 0-20% by weight of the additive.

In a more preferred embodiment, the organoleptic swelling agent is 20-40% by weight, more preferably 40-60% by weight, still more preferably 60-80% by weight or preferably 80-100% by weight, 20-40%, 40-60%, 60-80% or 80-100% by weight of the total additive. Scanning Electron Microscope (SEM) photos with scientific analysis have provided proof of biodegradation taking place using the above mixture of chemical compounds in three months time. See examples below for further discussion regarding the SEM photos.

The glutaric acid compound may be propylglutaric acid for example, but is not limited thereto.

The polycaprolactone polymer may be selected from, but is not limited to the group of: poly $\in$-caprolactone, polycaprolactone, substituted polycaprolactones and the like.

The swelling agents may be selected from, but is not limited to the group of: natural fibers, cultured colloids, organoleptic compounds, cyclo-dextrin.

The carrier resin may be selected from, but is not limited to the group of: ethylene vinyl acetate, poly vinyl acetate, maleic anhydride, and acrylic acid copolymers with olefins.

Once the additive has been formulated, it must be rendered into a form that will allow even distribution of the additive into the polymeric material that is desired to be made biodegradable. This can be accomplished by granulation, powdering, making an emulsion, suspension, or other medium of similar even consistency.

In a preferred embodiment, the additive is blended into the polymeric material just before sending the polymeric material to the forming machinery for making the desired article or finished polymeric product.

Any carrier resin may be used with one embodiment of the present invention (such as poly-vinyl acetate, ethyl vinyl acetate, etc.) where poly olefins or any plastic material that these carrier resins are compatible with can be combined chemically and allow for the dispersion of the additive.

Current additives without the carrier resins may be used in varying proportions and blended in with any plastic product, biodegradable additive or product such as poly lactic acid, oxy degradable additives, or non plastic product.

Further, the additive of the present invention will work with renewable resources (Green) plastic products such as Duponts Sorano. The current invention will also work with any form of plastic molding process that has been created for the purpose of producing end products, i.e. injection, thermoforming, blown, extrusion, roto, spray-on coating or dipping on layer into another.

In yet another preferred embodiment, the invention is a film with one or more layers, where each layers includes a different product or combination of products to allow for new biodegradable products to be manufactured that have improved properties. These properties would include: all the benefits of a poly lactic acid product (meets the ASTM D-6400-99 standard for biodegradability in 180 days) and those of a polyethylene plastic layer that retains its shelf life indefinitely and provides for strength, protection from light, oxygen, moisture, heat, and mechanical stress. Enzymes can be applied to the layers using vapor deposition, wherein other materials are in the other layers and more than one species of enzymes can be selectively applied to the layers. For instance, each microbe and/or enzyme can be selected for its capability to produce one or more beneficial by-products, such as methane, ozone, or oxygen In addition, any of the layers could have micro perforations or perforations of varying sizes and shapes that would allow for varying amounts for moisture, water, liquids, gas, etc. to pass through a less permeable, biodegradable plastic layer made using the biodegradable additive technology. Once the gas, liquid or moisture substance passes through an outer layer (which is of varying dimensions, sizes and shapes as well as physical and chemical properties), the inner layers will begin to biodegrade at a pre-designed rate. For example, a bottle that has a thin layer of polyethylene plastic with the biodegradable additive on the exterior can sustain a full shelf life because the interior layer contacting a liquid is keeping the liquid away from the biodegradable material on the outside of the bottle. Also, the inner material provides rigidity against mechanical stress. Once the bottle is put into landfill, moisture and microbes will attack the outer portion of the bottle and degrade it quickly. Finally, the inner layer of film will come into contact with microbes and biodegrade at a different rate of time.

Another embodiment is a multilayered biaxial oriented film (made from polypropylene, polyethylene, polystyrene, etc.) that has layer(s) of starch based materials or green recycled polyethylene terepthalate materials or a combination of material(s) in combination with the normal plastic materials with the new biodegradable additive such as plastic with additive according to one embodiment of the present invention covering composite polymer material. In one embodiment, a layer of the film comprises a plant-based polymer preferably derived from renewable resources. In a preferred embodiment, the plant-based polymer layer further comprises a layer of 100% biodegradable thermal adhesive.

Any variation of the layering approach and/or using some other design like honey comb hexagon shapes or any other can be employed using the present invention.

In a further preferred embodiment, metals are part of the additive's composition to induce rusting with or without the layered approach. Metals add strength to a given item while allowing them to rust through and allow for degrading. All types of metal particles can be included in the mix to produce new variations with differing properties. Since rust particles are air borne the new material would begin to rust and degrade once it comes into contact with moisture.

Colorants, inks and metallic particles are preferably added to the additive or into any layer in any combination of the additive. The colorants, inks and metallic product increase or decrease light (UV) reflectance, add strength, slow or prevent the breakdown of a layer, or vary the time to break down i.e. degradation or biodegradation at a specific time.

In another preferred embodiment, the introduction of a marker for the purpose of quality control (important to know that a designed % by load weight of the invention additive is present) is a part of the additive. Materials such as: CS131, C-14, phosphorescent materials, minerals that glow in the dark, alpha emitting particles with short half life that the concentrations can be easily measured with instrumentation in use today and are easily used to ensure the quality and effectiveness of the additive.

The present invention biodegrades high impact polystyrene, polystyrene, polypropylene, polyethylene terepthalate, high density polyethylene, low density polyethylene, and others. Scanning Electron Microscope was used to test the biodegradability of these materials when mixed in a 1% to 5% by load weight of additive to plastic.

The following is an example of a layer composition of a preferred embodiment. Multilayered films, such as ultra multilayered polyethylene terephthalate (trade marked Tetoron MLF), which is extremely thin film technology that laminates 200 to 300 layers or more of two types of polymer films has been improved on but not limited to the following example: Layer 1 (UV or light prevention layer), Layer 2 (Layer of biodegrading microbes suspended in plastic), Layer 3 (Fragrance or flavoring layer), Layer 4 (Smell attractant layer for microbes,), Layer 5 (Green product layer like such as Dupont Sarano™), Layer 6 (Initiators layer that modify the polymers i.e. via light, heat, high energy, free radicals), Layer 7 ("Memory" polymer layer that returns a molecules to previous shapes when a pre designed temperature or condition is met), Layer 8 (Perforated or micro perforated layer(s) with the additive that allow moisture/water or some specified inducer in the form of a gas or liquid through the perforations and into the inner layer allowing for the stimulation of the microorganisms (bacteria, mold fungi, yeast, enzymes, etc) and the biodegradation process to begin.

Referring now to FIG. 1, one embodiment of creating a biodegradable polymer is illustrated. Layers can be rearranged into most any combination and additional layers can be added or eliminated as required. The microbe layer(s) (Layer 2 of the example) comprises: thermophilic microbes and *Pseudomonas putida*, which occurs naturally in soil and can live on styrene. The microbes may be suspended and resuspended upon interaction with water or other fluid. The microbes may be oil eating microbes such as alcanivorax borkumensis.

An example of suitable microbes mixed into the additive of the present invention is called chemo heterotrophic prokaryotes. These bacteria function as decomposers breaking down corpses, dead vegetation, and waste products Nitrogen-fixing prokaryotes. Many prokaryotes live with other organisms in symbiotic relationships such as mutualism and commensalisms. To allow for a particular form on microbe (mold, fungi, bacteria, etc.) to function in decomposing/biodegrading of plastic, the proper nutrients is important in the plastic for them to feed on it. The microbes may be able to remain dormant while suspended in a thin layer matrix of some plastic or other compound. The microbes are activated in use when they come into contact with an initiator such as water and begin to decompose or biodegrade the plastic containing the specific nutrient.

In one preferred embodiment, the microbe and furanone material are dispersed within a capsule in order to facilitate controlled release of the additive. The capsule acts to contain the microbes and furanone and separate it from the polymers so that it doesn't get mixed directly into the polymers during the melting phase.

In another preferred embodiment, the additive includes one or more antioxidants that are used to control the biodegradation rate. Antioxidants are chosen based upon the specific application, and the biodegradable monomers may be either synthetic or natural.

In yet another preferred embodiment, the additive is dispersed into polymeric compositions using one or more supercritical fluids. The supercritical fluids are used to diffuse additives into raw material polymeric resin or even finished polymeric products. The process for treating polymeric resins with supercritical fluids includes one or more of: (1) supercritical diffusion of one or more additives into a polymeric resin; (2) concurrent compounding in the supercritical fluid; and (3) further process of the resulting infused or interdiffused polymeric resin, by known techniques, to yield the desired final product(s).

In a further preferred embodiment, the microbes are genetically engineered and customized for the particular biodegradable polymeric material. Examples are genetically engineered microbes producing protease specific for a biodegradable plastic (for example, poly ∈-caprolactone). These genetically engineered microbes are designed to excrete beneficial gases and energy byproducts. These microbes use enzyme-based routes to monomer, oligomer and polymer synthesis as well as polymer modification.

In another preferred embodiment, the additive comprises a graft copolymer. The graft copolymer preferably comprises a lactone, a lactide or a polylactone reacted with an ethylenic resin. The ethylenic resin can include, but is not limited to, ethylenic resins modified to contain pendant functional groups, copolymers of ethylene with other olefins such as propylene, copolymers with acrylic acid, methacrylic acid, methyl and ethyl acrylates, copolymers with ethylacrylate, copolymers with vinyl acetate and copolymers with vinyl alcohol. The graft copolymer is preferably a pellet that is combined with other components of the additive. However, the graft copolymer may also be in liquid form and poured into the additive. The graft copolymer is biodegradable and thus increases the biodegradability of the additive. Further, graft copolymers may have high yield strength and high break strength compared to linear low density polyethylene.

In a further embodiment of the present invention, the additive preferably comprises apidic acid (HOOC—$(CH_2)_4$—COOH) which can, but is not required to replace glutaric acid as a less expensive component. Apidic acid has the same carbon skeleton as glutaric acid except that it has one additional methylene ($CH_2$) group between the terminal carboxylic acid groups. In an alternative embodiment, the additive preferably comprises an aldaric acid (HOOC—$CHOH)_n$—COOH), a group of sugar-derived dicarboxylic acids. In this embodiment, aldaric acid can, but is not required to replace glutaric acid as a more efficient component.

In an alternative embodiment, the additive preferably comprises 1,3-butanediol which may form biodegradable ester linkages. 1,3-Butanediol is preferably used as a solvent, and more preferably as a solvent for food flavoring agents and is a co-monomer used in certain polyurethane and polyester resins. 1,3-Butanediol can also be used as a hypoglycaemic agent. In yet a further embodiment, the additive preferably comprises terephthalic.

In a preferred embodiment of the present invention, a biodegradable additive for polymeric material comprises a chemo attractant compound, an apidic acid and/or an aldaric acid, a carboxylic acid compound, a polymer and a swelling agent. In an alternative embodiment, a biodegradable additive for polymeric material comprises a chemo attractant compound, an apidic acid and/or aldaric acid, a carboxylic acid compound, 1,3-butanediol, a polymer and a swelling agent. In yet another alternative embodiment, a biodegradable additive for polymeric material comprises a chemo attractant compound, an apidic acid and/or an aldaric acid, a carboxylic acid compound, terephthalic acid, a polymer and a swelling agent.

Microbial Intelligence

Microbial intelligence (popularly known as bacterial intelligence) is the intelligence shown by microorganisms. The concept encompasses complex adaptive behavior shown by single cells, and altruistic and/or cooperative behavior in populations of like or unlike cells mediated by chemical signaling that induces physiological or behavioral changes in cells and influences colony structures. In the present invention, microbial intelligence can be used to cause microbes to cooperatively degrade a plastic product.

Complex cells, like protozoa or algae, show remarkable abilities to organize themselves in changing circumstances. Shell-building by amoebae, reveals complex discrimination and manipulative skills that are ordinarily thought to occur only in multicellular organisms.

Even bacteria, which show primitive behavior as isolated cells, can display more sophisticated behavior as a population. These behaviors occur in single species populations, or mixed species populations. Examples are colonies of Myxobacteria, quorum sensing, and biofilms.

It has been suggested that a bacterial colony loosely mimics a biological neural network. The bacteria can take inputs in form of chemical signals, process them and then produce output chemicals to signal other bacteria in the colony.

The mechanisms that enable single celled organisms to coordinate in populations presumably carried over in those lines that evolved multicellularity, and were co-opted as mechanisms to coordinate multicellular organisms.

Microbes can also transfer DNA and RNA between cells and adapt to the environment.

Flavors

In one embodiment of the present invention, the additive comprises at least one flavorant. The flavorant preferably attracts microbes and stimulates the breakdown of the polymer. A list of flavors can include, but is not limited to, oleoresin, essence or extractive, protein hydrolysate, distillate, or any product of roasting, heating or enzymolysis, which contains the flavoring constituents derived from a spice, fruit or fruit juice, vegetable or vegetable juice, edible yeast, herb, bark, bud, root, leaf or any other edible portions of a plant, meat, seafood, poultry, eggs, dairy products, or fermentation products thereof. Other flavors can include, but are not limited to, glutamic acid salts, glycine salts, guanylic acid salts, inosinic acid salts, 5'-ribonucleotides salts, acetic acid, citric acid, lactic acid, malic acid, and tartaric acid.

Quorum Sensing

Quorum sensing is the process by which many bacteria coordinate their gene expression according to the local density of their population by producing signaling molecules. Quorum sensing coordinates certain behavior or actions between bacteria, based on the local density of the bacterial population. Quorum sensing can occur within a single bacterial species as well as between diverse species, and can regulate a host of different processes, essentially serving as a simple communication network.

For example, opportunistic bacteria, such as *Pseudomonas aeruginosa* can grow within a host without harming it, until they reach a certain concentration. Then they become aggressive, their numbers sufficient to overcome the host's immune system and form a biofilm, leading to disease. It is hoped that the therapeutic enzymatic degradation of the signaling molecules will prevent the formation of such biofilms and possibly weaken established biofilms. Disrupting the signaling process in this way is called quorum quenching.

Bacteria that use quorum sensing produce and secrete certain signaling compounds (called autoinducers or pheromones), one example of which are N-acyl homoserine lactones (AHL). These bacteria also have a receptor that can specifically detect the AHL (inducer). When the inducer binds the receptor, it activates transcription of certain genes, including those for inducer synthesis. There is a low likelihood of a bacterium detecting its own secreted AHL.

When only a few other bacteria of the same kind are in the vicinity, diffusion reduces the concentration of the inducer in the surrounding medium to almost zero, so the bacteria produce little inducer. With many bacteria of the same kind, the concentration of the inducer passes a threshold, whereupon more inducer is synthesized. This forms a positive feedback loop, and the receptor becomes fully activated. This induces the up regulation of other specific genes, such as luciferase in *V. fischeri*. This is useful since a single *V. fischeri* bacterium that is luminescent would have no evolutionary advantage and would be wasting energy.

In an embodiment of the present invention, quorum sensing is used to attract bacteria to the polymer in order to enhance the biodegradability of the polymer. A quorum sensing agent is preferably an ingredient in the additive in order to attract microbes to begin metabolizing the polymer.

In another embodiment, the additive is optionally blended with a polymeric resin and used to fabricate woven polypropylene products, such as Demo bags. In this embodiment, the additive and polymeric resin are blended and formed into a polypropylene fiber that is woven into the Demo bags in order to improve bio-degradation performance.

Other products that the additive can be used in include, but are not limited to: food packaging (for example, water bottles, milk cartons, juice cartons, yogurt containers), shoes, clothing, other apparel, pharmaceutical products (for example, medical devices and prescription drug bottles), toys of all types, film packaging, plastic bags of all types, electrical products, automotive products, modeling plastics for all uses, health and beauty products, hot melt/glue, plumbing pipe and related products, construction products (for example, siding, decking and roofing), tire and rubber products, marine products, recreational products, sporting goods, and sports related products.

Example 1

An Example composition of a preferred embodiment is shown below for addition to a high density polyethylene. In order to make the high density polyethylene biodegradable, blend together the additive components in the following proportions:

The furanone compound in a range equal to or greater than about 0-20%, or about 20-40%, or about 40-60%, or about 60-80% or about 80-100% by load weight of the total additive; the glutaric acid in the range equal to or greater than about 0-20%, or about 20-40%, about 40-60%, about 60-80% or about 80-100% by weight of the total additive; the hexadecanoic acid compound in the range equal to or greater than about 0-20%, or about 20-40%, or about 40-60%, or about 60-80% or about 80-100% by weight of the total additive; the polycaprolactone polymer in the range equal to or greater than about 0-20%, or about 20-40%, or about 40-60%, or about 60-80% or about 80-100% by weight of the total additive; the lactic acid polymer or copolymer with glycolic acid and/or $\in$-caprolactone in the range equal to or greater than about 0-20%, or about 20-40%, or about 40-60%, or about 60-80% or about 80-100% by weight of the total additive and natural or manmade organoleptic material (natural fiber, cultured colloid, cyclo-dextrin, etc.) in the range equal to or greater than about 0-20%, or about 20-40%, or about 40-60%, or about 60-80% or about 80-100% by weight of the total additive.

Testing results from several independent testing laboratories have established the biodegradability of plastic test films, foams and other forms which utilized the biodegradable formulation. The tests concluded that the films, foams and other forms were biodegradable under short and long-term anaerobic and aerobic conditions. In Examples 2-8, parallel sets of polymer samples as indicated, with and without additive, were subjected to an anaerobic environment by immersion in the anaerobic sludge digester of a municipal waste treatment plant according to the ASTM D5210 test protocol.

Example 2

Samples of polyvinylchloride foam with additive (sample A) and without additive (sample B) were examined under a Scanning Electron Microscope (SEM). In addition, samples of polyvinylchloride foam with additive (sample C) and without additive (sample D) were sonicated in detergent for 5 minutes to remove attached biofilm and microbial colonies. Subsamples of approximately 1 square centimeter were cut from larger samples to prepare for imaging.

Analysis of the samples was carried out on a JEOL 5800LV SEM. The SEM was equipped with an Oxford Instruments Energy Dispersive X-ray spectrometer (EDX) and an Oxford X-ray analyzer and image system. Accelerating voltage was 15 kV with a beam current of approximately 0.01 nA.

It was observed that the sample A surface displayed a large amount of biofilm attached. The biofilm occupied depressions in the surface. In other areas, the biofilm and colonies sit in large continuous depressions. Also visible were cracks in the polyvinylchloride which were exposed by shrinkage of the biofilm during drying.

It was observed that the sample C surface displayed shallow depressions under the microbial colonies after they had been removed. These depressions were irregular in outline, reflecting the irregular outline of the microbial colonies.

It was observed that the sample B surface displayed a large amount of biofilm attached. It was observed that the sample D surface displayed no biofilm or colonies. Only a few depressions were observed that could be identified as associated with microbial colonies. The depressions seen on the surface of sample D were much less common than on sample C.

Based on the example above, it is apparent that the microbial colonies are embedded in the surface of the treated sample, mostly occurring in shallow depressions. The microbes tenaciously attached to the treated surface and there were more colonies present, as compared to the untreated sample. The depressions under the colonies indicate that they are degrading the material much faster than the untreated polyvinylchloride, due to the additive present in the treated sample. The additive is not present in the control sample, and microbial degradation is much slower there.

Example 3

Samples of polyethylenepthalate with additive (sample A) and without additive (sample B) were examined under a SEM. Both samples were cleaned in an ultrasonic cleaner with a mild detergent.

Analysis of the samples was carried out in the same way that the samples in Example 2, were carried out with the same instrument.

It was observed that sample A surface displayed bubbles just below the surface, broken bubbles at the surface, subparallel striations and scratches and other mechanical damage. Sample A shows significant evidence of biodegradation.

It was observed that sample B surface displayed a very smooth surface where most defects were a result of mechanical processes.

Sample A shows significant differences from sample B. For example, sample A shows numerous bubbles, possibly from microbial gas production within the plastic, and odd ribbon-like defects of unknown origin, in addition to sloughing skin. Sample B shows little effect. Sample A is being severely degraded, while sample B is only slightly degraded.

Example 4

Samples of polystyrene foam with additive (sample A) and without additive (sample B) were examined under a SEM.

Analysis of the samples was carried out in the same way that the samples in Example 2, were carried out with the same instrument.

It was observed that sample A surface displayed several types of surface damage, such as a large ragged holes, and ragged edges and cracks around the holes.

It was observed that sample B surface displayed smooth holes most likely related to the foam making process.

Surface degradation is present in sample A and it is believed that the jagged holes in sample A are of a different origin than the smooth holes on sample B. Sample A exhibits significant differences from sample B. Thus, the changes to sample A are a result from the additive.

Example 5

Samples of high impact polystyrene nursery plant labels with additive (sample A) and without additive (sample B) were examined under a SEM.

Analysis of the samples was carried out in the same way that the samples in Example 2, were carried out with the same instrument.

It was observed that sample A surface numerous had irregular pits and smaller crater-like holes. A surface layer cracking and peeling away produced the large pits. The smaller crater-like holes could be seen within the shallow pits. The small holes had no apparent relationship to the tensional cracks seen around the large pits.

It was observed that sample B surface displayed an inherent surface roughness, but showed little in the way of degradation. A few surface defects were observed, but they were most likely due to mechanical damage rather than degradation.

Sample A and sample B displayed obvious differences. Sample A showed a large number of pits and cracks that did not appear on sample B. The surface of sample A was highly altered. Since major changes only occurred on sample A, they were most likely a result of the additive used to treat sample A.

Example 6

Samples of bubble wrap with additive (sample A) and without additive (sample B) were examined under a SEM. In addition, samples of polyvinyl chloride foam with additive (sample C) and without additive (sample D) were sonicated in detergent for 5 minutes to remove attached biofilm and microbial colonies.

Analysis of the samples was carried out in the same way that the samples in Example 2, were carried out with the same instrument.

It was observed that sample A surface showed a diverse and thriving microbial community attached to the bubble wrap. There were also curved pits in the bubble wrap due to dissolution of the plastic by attached bacteria.

It was observed that sample C surface displayed abundant small circular pits. These pits may be due to direct dissolution by microbes attached to the surface.

It was observed that sample B surface was smooth even with a large quantity of microbes attached. The community appeared to be a difference community than observed on sample A.

It was observed that sample D surface was smooth and fairly featureless, but exhibited a pattern of raised ridges that are roughly parallel. There were some pits, but they were much smaller than the bacteria indicating that the pits were probably not produced by the bacteria.

Samples A and C displayed obvious differences than samples B and D. Pits and surface defects were widespread on samples A and C, but were present to a much lesser extent on samples B and D. Pits of all sizes and other surface features were exceedingly abundant across samples A and C, while less common on samples B and D. The pits on samples A and C were most likely related to microbial breakdown of the plastic, since they were often the same size as the bacteria.

Example 7

Polypropylene samples of 1 cm were examined by SEM for evidence of biodegradation is sample A treated with additive and sample B untreated with additive. SEM analysis was conducted as described in Example 1.

Sample A demonstrated abundant pits created by the microbial colonies and biofilm. The holes and pits range in size from about 1-2 um to about 10-50 um and larger. The holes contain visible microbes. In addition the surface shows sloughing and lifting which is attributable tin part to the microbial action in the subsurface.

In contrast sample B demonstrates a smooth surface without pits and holes of the type observed in sample A. Untreated Sample B does not demonstrate outer skin that has developed on the treated sample.

Example 8

Attenuated Total Reflectance infrared (ATR) analysis of polystyrene treated with additive (Sample A) and polystyrene that is untreated (Sample B) was conducted. The ATR spectra for sample A exhibits absorption at 1736.55 cm-1, that is not present in the ATR spectrum of the untreated Sample B. The peak at 1736 is an indication of the presence of a carbonyl (C=O) group, most probably as a carboxylic acid or carboxylate moiety. This suggests that oxidative biodegradation is occurring in the treated Sample A.

Example 9

Referring now to FIG. 2 a comparative FTIR spectra of 2% additive-treated polyethylene samples before and after biodegradation testing. Biodegradation had progressed to 3.3% as measured by $CO_2$ and methane gas evolution in the ASTM D5511 anaerobic digestion test. The broad absorption centered around 3300-3400 $cm^{-1}$ is clearly due to hydroxyl (—OH) groups. This is a very broad band because of the strong hydrogen bonding that occurs among the hydroxyl groups. It is generally recognized that a first step in oxidative degradation, whether biologically or chemically induced, is oxidation of a backbone carbon to place an —OH group thereon. This can proceed further to the ketone (carbonyl) stage. Thereafter, either from the hydroxyl or ketone stage, chain scission generally takes place, typically placing aldehyde or carboxylic acid groups at the newly-formed chain ends, which would give rise to typical carbonyl absorbtions in the 1600-1800 $cm^{-1}$ region. Both the hydroxyl and carboxyl group characteristic absorptions are clearly seen in FIG. 2, the latter broadened due to the presence of cleaved polymer chains of undoubtedly greatly varying lengths.

Differential Scanning Calorimetry (DSC) Studies

The mechanical and thermal properties of the samples in Example 7 significantly depend on the crystal structure, degree of crystallinity, molecular weight and branching. The temperatures of the melting range and glass transition point vary strongly with the polymer type.

For the samples, the interest was mainly focused on the glass transition temperature (Tg), melting range and heat of fusion (crystallinity), and decomposition of the material.

The DSC results show that for sample B, the exothermic (crystallization) peak shifted to a different temperature compared to sample C. This shift is due in part to biodegradation.

Based on the analytical data above, samples A and B are undergoing biodegradation.

A size exclusion chromatographic (SEC) analyses of polyethylene samples with 1-5% by weight load additive and without additive were carried out using 98% tetrahydrofuran (THF) and 2% triethyl amine as the mobile phase.

The samples were dissolved in mobile phase and filtered before analysis. Based on the chromatograms presented the peak in the control sample at retention time 4.5 minutes has disappeared in the 5% additive and has decreased in 1% additive. The disappearance of this high molecular weight peak is an indication of material degradation. Also another indication is the increase in the peak area for low molecular weight fraction at retention time 9.4 minutes. Taken together, it appears that the samples tested above have undergone biodegradation of about 4%.

Based on the FTIR/ATR, DSC and SEC analyses it is clear that the samples show evidence of polymer biodegradation.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosure of all references, applications, patents, and publications cited above are hereby incorporated by reference.

What is claimed is:

1. An admixture for use as a biodegradable additive for enhancing biodegradation of polymeric material when added thereto comprising:
   a furanone;
   a glutaric acid;
   a carboxylic acid compound comprising a chain length from about 2 to about 36 carbons;
   a polymer selected from the group consisting of poly ∈ caprolactone, polycaprolactone, poly(lactic acid), poly (glycolic acid), and poly(lactic_co_glycolic acid); and
   a carrier resin selected from the group consisting of polydivinyl benzene, ethylene vinyl acetate, polyethylene, polypropylene, polystyrene, polyethylene terephthalate, polyvinyl chloride, methyl methacrylate, polycarbonate, polyamide, poly olefins and any copolymers of said polymers.

2. The biodegradable additive for polymeric material of claim 1 further comprising a microbe which can digest the polymeric material.

3. The biodegradable additive of claim 1 further comprising a compatibilizing additive.

4. The biodegradable additive for polymeric material of claim 1 further comprising one or more selected from colorants, inks, or metallic particles.

5. The biodegradable additive for polymeric material of claim 1 wherein the co-polymer is a graft copolymer.

6. The biodegradable additive for polymeric material of claim 5 wherein said graft copolymer comprises a polylactone, a lactone, or a lactide and an ethylenic resin.

7. A method of creating a layered polymer plastic comprising:
   providing at least one layer of a polymer selected from the group consisting of polyolefins, polystyrene, polyesters, polyamides; and layering a admixture of claim 1 around, about, or on the polymer to create a new biodegradable product that is at least partially biodegradable.

8. The method of claim 7 wherein at least one layer comprises an enzyme produced by a microorganism suitable for degrading the polymer.

9. The method of claim 8 wherein the enzyme are applied to the at least one layer using vapor deposition.

10. The method of claim 7 wherein at least one layer has perforations.

11. The method of claim 7 wherein the layering is biaxially oriented.

12. The method of claim 7 wherein the layering is shaped like honey comb hexagon shapes.

13. The method of claim 7 wherein an inner layer is rigid against mechanical stress.

14. The method of claim 7 wherein at least one layer comprises a fragrance.

15. The method of claim 7 wherein at least one layer comprises a smell attractant for microbes.

16. The method of claim 7 wherein at least one layer comprises an initiator that modifies the polymer.

17. The method of claim 7 wherein at least one layer comprises a graft copolymer.

18. The additive of claim 1 wherein the polymeric material is a non-biodegradable polymeric compound which is rendered by addition of the admixture at least partially biodegradable.

19. A biodegradable additive system that renders a non-biodegradable polymeric compound at least partially biodegradable comprising:
   an additive comprising a furanone, a diacid, and a carboxylic acid compound; and
   a non-biodegradable polymeric compound, wherein the additive is mixed with the non-biodegradable polymeric compound rendering the non-biodegradable polymeric compound at least partially biodegradable.

20. A method for using the system of claim 19 comprising:
   providing the additive;
   mixing the additive with a non-biodegradable polymeric compound resulting in a final product, wherein the final product is at least partially biodegradable;
   using the final product;
   disposing the final product; and
   the final product biodegrading after use.

* * * * *